United States Patent [19]

Taniuchi et al.

[11] Patent Number: 5,200,832
[45] Date of Patent: Apr. 6, 1993

[54] COLOR IMAGE RECORDING DEVICE WITH COLOR EDIT AND CONVERSION PROCESSING

[75] Inventors: Kazuman Taniuchi; Katuyuki Kouno; Hiroshi Sekine; Yoshihiro Terada, all of Kanagawa, Japan

[73] Assignee: Fuji Xerox Co., Ltd., Tokyo, Japan

[21] Appl. No.: 882,006

[22] Filed: May 13, 1992

[30] Foreign Application Priority Data

May 14, 1991 [JP] Japan .................................. 3-109242

[51] Int. Cl.$^5$ ....................... H04N 1/29; H04N 1/387; H04N 1/46
[52] U.S. Cl. ..................................... 358/300; 358/76; 358/80
[58] Field of Search ....................... 358/300, 80, 75, 76

[56] References Cited

U.S. PATENT DOCUMENTS 5,060,060 10/1991 Udagawa ............................. 358/80

FOREIGN PATENT DOCUMENTS 64-47988 2/1989 Japan .

Primary Examiner—Benjamin R. Fuller
Assistant Examiner—Scott A. Rogers
Attorney, Agent, or Firm—Finnegan, Henderson, Farabow, Garrett and Dunner

[57] ABSTRACT

A color image recording device for use in a color copying machine, a color facsimile, a color printer and the like, which has a function to perform color edit processings including a color conversion processing, a coloring processing and the like.editing with ease and with high accuracy. Data B, G, and R output from an image read unit are converted to data L*, a*, and b* respectively by first color signal conversion unit and further the data a* and b* are then converted to data H and C by third color signal conversion unit. Image data V, H and C are color edited by image edit block and the output thereof H and C are converted to a* and b* respectively by fourth color signal conversion unit. The outputs of the first color signal conversion unit are also input to delay unit, are delayed by a time equal to a processing time in image edit unit by the delay unit, and are then input to selector unit. The selector unit, in accordance with a switching control signal $S_{cont}$ output from the image edit block, outputs either of the color edited data L*, a* and b* that are output from the image edit unit or the data L*, a* and b* that are output from the delay unit.

10 Claims, 15 Drawing Sheets

FIG. 8

| INPUT | | | OUTPUT | | | |
|---|---|---|---|---|---|---|
| LOGIC | flag | V>CP | psel | zt | sp | |
| 0 0 0 | — | — | 0 | 1 | 0 | THROUGH |
| 0 0 1 | 0 | — | 0 | 0 | 0 | CHARACTER COLORING |
| 0 0 1 | 1 | — | 1 | 1 | 0 | |
| 0 1 0 | 0 | — | 1 | 1 | 0 | DECOLORRATION CHARACTER |
| 0 1 0 | 1 | — | 1 | 1 | 1 | |
| 0 1 1 | — | 0 | 1 | 1 | 0 | NON-USED |
| 0 1 1 | — | 1 | 0 | 1 | 0 | |
| 1 0 0 | — | — | 1 | 1 | 0 | PAINTING |
| 1 0 1 | 0 | — | 0 | 1 | 0 | CHARACTER COMPOSITION |
| 1 0 1 | 1 | — | 1 | 1 | 0 | |
| 1 1 0 | 0 | — | 1 | 1 | 0 | COLORING |
| 1 1 0 | 1 | — | 0 | 1 | 0 | |
| 1 1 1 | 0 | 0 | 0 | 1 | 0 | NON-USED |
| 1 1 1 | 0 | 1 | 0 | 1 | 0 | |
| 1 1 1 | 1 | 0 | 0 | 1 | 0 | |
| 1 1 1 | 1 | 1 | 0 | 1 | 0 | |

| LOGIC 2,1,0 | function | OUTPUT f.g. | OUTPUT b.g. | OPERATION |
|---|---|---|---|---|
| 0,0,0 | THROUGH | video | |  |
| 0,0,1 | CHARACTER COLORING | color_palt | 0 (BLANKING) |  |
| 0,1,0 | DECOLORATION CHARACTER | fore_palt | color_palt |  |
| 1,0,0 | PAINT | color_palt | |  |
| 1,0,1 | CHARACTER SYNTH. | color_palt | video |  |
| 1,1,0 | COLORING | video | color_palt |  |

FIG. 10

| TSEL | MEANING | OPERATION |
|---|---|---|
| 0 | ANNOTATION | DETERMINE f.g. WHEN V>TH |
| 1 | CHARACTER SYNTH. | TEX (CHARACTER MEMORY READ VALUE) DETERMINE f.g. WHEN THE VALUE=1 |

FIG. 11

| MUL | | | | MPX COEFFICIENT |
|---|---|---|---|---|
| 3 | 2 | 1 | 0 | |
| 0 | 0 | 0 | 0 | THROUGH |
| 0 | 0 | 0 | 1 | A |
| 0 | 0 | 1 | 0 | B |
| 0 | 0 | 1 | 1 | C |
| 0 | 1 | 0 | 0 | D |
| 0 | 1 | 0 | 1 | E |
| 0 | 1 | 1 | 0 | F |
| 0 | 1 | 1 | 1 | G |
| 1 | 0 | 0 | 0 | H |
| 1 | 0 | 0 | 1 | I |
| 1 | 0 | 1 | 0 | J |
| 1 | 0 | 1 | 1 | K |
| 1 | 1 | 0 | 0 | L |
| 1 | 1 | 0 | 1 | M |
| 1 | 1 | 1 | 0 | N |
| 1 | 1 | 1 | 1 | O |

FIG. 12

| CCSEL | | | OPERATION OF COLOR CONV. CKT. | | | |
|---|---|---|---|---|---|---|
| 2 | 1 | 0 | D | C | B | A |
| 0 | 0 | 0 |   |   |   |   |
| 0 | 0 | 1 |   |   |   | O |
| 0 | 1 | 0 |   |   | O |   |
| 0 | 1 | 1 |   | O |   |   |
| 1 | 0 | 0 | O |   |   |   |
| 1 | 0 | 1 |   |   | O | O |
| 1 | 1 | 0 |   | O | O | O |
| 1 | 1 | 1 | O | O | O | O |

FIG. 13

| NEG | MEANING |
|---|---|
| 0 | NORMAL COPY |
| 1 | NEGA/POSI INVERSION |

FIG. 14A
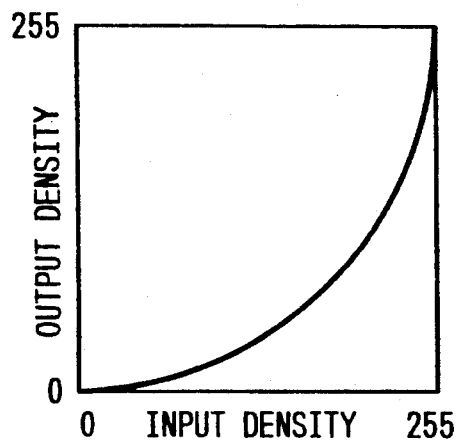
FIG. 14B
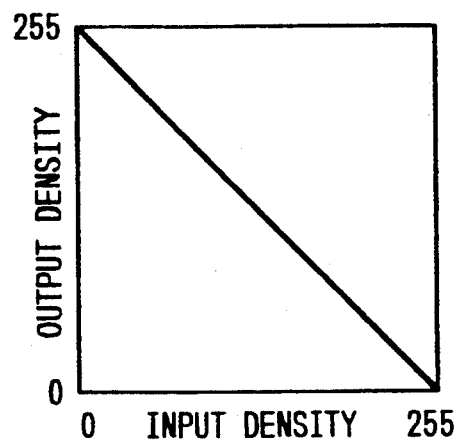
FIG. 15
| TYPE | | ORIGINAL TYPE |
|---|---|---|
| 1 | 0 | |
| 0 | 0 | STD |
| 0 | 1 | CHARACTER |
| 1 | 0 | PHOTOGRAPH |
| 1 | 1 | MAP |
FIG. 16
| FUL | MON | ORIGINAL MODE |
|---|---|---|
| 0 | 0 | THREE COLORS |
| 0 | 1 | MONO, B/W |
| 1 | 0 | FOUR COLORS |
| 1 | 1 | FOUR COLORS |

| ESS | | MEANING |
|---|---|---|
| 1 | 0 | |
| 0 | 0 | SCANNER |
| 0 | 1 | AUX |
| 1 | 0 | TEXTURE COMPOSITION |
| 1 | 1 | TRANSPARENT COMPOSITION |

COLOR IMAGE RECORDING DEVICE WITH COLOR EDIT AND CONVERSION PROCESSING

BACKGROUND OF THE INVENTION

1. Field of the Invention

The present invention relates to a color image recording device for use in a color copying machine, a color facsimile, a color printer and the like and more particularly to a color image recording device which has a function to perform color edit processings including a color conversion processing, a coloring processing and the like.

2. Description of the Related Art

A conventional digital color copying machine comprises an image reading unit which scans an original document to read image data thereon, an image editing unit for processing and editing the image data, an image outputting unit for recording the processed and edited image data, and a control unit for controlling the image reading unit, image editing unit and image outputting unit. In the conventional digital color copying machine, the image data is subjected to a variety of editing processing in the image editing unit.

The schematic structure of the conventional digital color copying machine having the above-mentioned image editing function will be described with reference to an embodiment disclosed in Published Unexamined Japanese Patent Application No. 47988/1989.

In FIG. 21 which is a block diagram showing the structure of an image data processing system employed in the above-mentioned digital color copying machine, an IIT (Image Input Terminal) 100 separates an image of a color original document into B (blue), G (green) and R (red) that are three primary colors of light by use of a CCD line sensor to be converted into digital image data, respectively. An IOT (Image Output Terminal) 115 performs exposure by means of a laser beam, development by means of a toner, and fixing to thereby reproduce a color image. An END conversion circuit 101 - an IOT interface 110, which are respectively interposed between IIT 100 and IOT 115, constitute an image data editing and processing system (which is referred to as IPS; Image Processing System). In particular, the IPS converts the image data of the three primary colors, R, G, B, signals into toner color signals including Y (yellow), M (magenta), C (cyan) and further K (black or India ink) and, every developing cycle, outputs the toner color signal that corresponds to the developing color.

The IIT 100 reads 1 pixel with a predetermined density of, for example, 400 spi with respect to each of B, G, R by use of the CCD sensor, to output an output signal for each of the colors in the form of density data of 8 bits, that is, of 256 gradations.

The IPS inputs the density data of B, G, R from IIT 100 and, in order to enhance the reproducibility of the colors, reproducibility of the gradations, reproducibility of the fineness, the IPS performs various kinds of data processings to convert the toner color signals of develop process colors into on/off signals and then outputs the on/off signals to the IOT 115.

An END conversion (Equivalent Neutral Density Conversion) module 101 is used to adjust and convert the three primary color signals each of 8 bits into grey balanced color signals, and a color masking module 102 is used to perform a matrix operation on the B, G, R signals to thereby convert them into the toner color signals that correspond to the amounts of toners of Y, M, C. An original document size detect module 103 detects the size of an original document in a pre-scanning step and erases a platen color, that is, performs a frame erasing processing in an original document read scanning step. A color conversion module 104 converts a color specified in a specified area in accordance with an area signal which is input from an area image control module 111.

And, UCR (Under Color Removal) and Black Generation Module 105 generates a proper amount of K, which is enough to prevent a muddy color from occurring, to thereby reduce the amounts of Y, M, C by an equal amount respectively according to the amount of K generated. At the same time, the Module 105 gates the K signal and Y, M, C signals after the under colors thereof are respectively removed in accordance with the respective signals of a mono-color mode and a 4-color full color mode.

A space filter 106 is a non-linear digital filter which has a function to recover blurring and a function to remove moire. A TRC (Tone Reproduction Control) Module 107 operates to adjust the density, contrast, color balance and the like in order to enhance the reproducibility.

A reduction/extension processing module 108 performs a reduction/extension processing in a main scanning direction, while the reduction/extension processing in a sub-scanning direction can be performed by adjusting the scanning speed of the original document.

A screen generator 109 converts a process color gradation toner color signal to an on/off binary toner color signal and outputs the same. In particular, the binary toner color signal is output through an IOT interface module 110 to the IOT 115. And, an area image control module 111 includes an area generator circuit and a switch matrix. Also, an edit control module includes a plane memory 112, a color palette video switch circuit 113, a font buffer 114 and the like and the edit control module is used to perform a various kinds of edit control.

In the area image control module 111, seven (7) rectangular areas and the priorities thereof can be set in the area generator circuit, and area control information is set in the switch matrix in such a manner that it corresponds to the respective areas. The area control information includes modulation select information as to color conversion, color modes including a mono color mode or a full color mode, photograph, characters and the like, TRC select information, screen generator select information and other similar information. The control information is used to control the color masking module 102, color conversion module 104, UCR module 105, space filter 106 and TRC module 107. Here, it should be noted that the switch matrix can be set by means of software.

The edit control module is used to read images in a non-rectangular area including, for example, a circle graph and the like and to paint out or completely color a specified area having an unlimited shape with a specified color, that is, the edit control module is adapted to be able to perform a coloring processing. In the edit control module, an area command of 4 bits is written into 4 pieces of plane memories and an edit command in each of the areas of the original document is set in terms of 4 bits using 4 pieces of plane memories.

In the above-mentioned IPS, when the three primary color signals are converted to the toner color signals, there arise some problems as to the following cases: that is, how to adjust the color balance; how to reproduce the color to the ITT read characteristic and to the IOT output characteristic; how to adjust the density balance and contrast balance; how to adjust the excessively increased contrast or blurring in the edge and the moire; and so on.

In order to solve these problems, with the IPS, the 8-bit data representing the three primary color signals, B, G, R, respectively, which are obtained by reading the original document with the IIT 100, are respectively input to the END conversion module 101, in which the 8-bit data are at first END converted and are then converted (that is, color toner masked) to the toner color signals of Y, M, C. Then, the IPS performs the original document size detecting, frame erasing and color converting processing, which can be performed efficiently by means of the full color data, and then removes the under colors thereof and generates the India ink, thereby selecting a toner color signal X of a developing color. On the other hand, the space filter, color modulation, TRC, reduction/extension and other similar operations are processed by processing the data of the developing color to thereby reduce the amount of processing when compared with the processing by means of the full color data, in particular, to reduce the number of conversion tables used to a third of that of the full color data processing. Simultaneously, the kinds of processings are increased accordingly to thereby enhance the adjustment flexibility, color reproducibility, gradation reproducibility and fineness reproducibility.

In case of the full color (4-color full color) processings, the original document size information, edit area information and other kinds of original document information are firstly detected in the pre-scanning operation. Then, for example, each time a copy cycle to convert the toner color signal X of the developing color to Y and then a copy cycle to convert the toner color signal X of the developing color to M, C, K respectively are executed sequentially, a signal processing corresponding to 4 times of original document read scannings is performed.

In the above-mentioned conventional digital color copying machine, the color editing processings including the color conversion, coloring and the like are performed on the toner color signals. In this manner, in the conventional color image recording device, since the color edit processings are performed on the toner color signals, Y, M, C, K or the three primary color signals, B, G, R, there is a limit to the improvement in the accuracy of the color editing. In other words, for example, if it is assumed that the color editing is performed on the three primary colors and when a color conversion operation to convert a desired color in the original document to another desired color is performed, the color to be converted in the original document and the color obtained after such conversion are respectively set in the densities of B, G, R. However, it is not easy for not only an ordinary user but also a skilled person to represent one color by the three primary colors and, therefore, it is difficult to accomplish such a color editing processing as desired.

Also, the three primary colors or toner colors vary according to the kinds of the color image recording devices and are not standardized color specification systems. Therefore, for example, even if image data produced by means of computer graphics can be input into a color copying machine or the like, the image cannot be always output in a desired color.

SUMMARY OF THE INVENTION

Accordingly, it is an object of the invention to provide a color image recording device capable of performing a color editing operation with amounts of a standardized color specification system to thereby set a color to be converted and a converted color with ease and high accuracy.

Another object of the invention is to provide a color image recording device capable of accomplished the above described object of the invention at high speeds and at low costs.

Still another object of the invention is to provide a color image recording device capable of perform various kinds of color editing operations.

In order to facilitate the setting of the colors to be edited such as the color to be converted, the converted color and the like, each of the colors may be set according to its brightness, hue and chroma. Because the quantities of the brightness, hue and chroma can be represented in the form of standardized color spaces, use of them allows the user to set the colors and at the same time even the image data that is obtained from other types of color image recording devices can also be treated in a standardized way. Actually, when the brightnesses and chromas of the color to be converted and converted color are left unchanged and only the hues thereof are converted, all of B, G, R of the converted colors must be set when the colors are set by the three primary colors. On the other hand, when the colors are represented by the brightness, chroma and hue, only the value of the hue of the color to be converted may be changed for the converted color, which means obviously that the colors can be set with ease.

Accordingly, a color image recording device according to the invention, as shown in FIG. 1, comprises an image read unit 1, a first color signal conversion unit 2, an image edit unit 3, a delay unit 4, a selector 5, a second color signal conversion unit 6 and an image output unit 7.

A original document image is color-separated by the image read unit 1, so as to produce three primary color signals, B, G, R digitalized to 8 bits, for instance. These digital signals are converted to a brightness signal $L^*$ of orthogonal coordinates, a first color difference signal $a^*$, and a second color difference signal $b^*$ by first color signal conversion unit 2.

The output of the first color signal conversion unit 2 is input to image edit unit 3 and delay unit 4. The image edit unit 3 includes third color signal conversion unit 8 which converts the first and second color difference signals $a^*$ and $b^*$ to a hue signal H and a chroma signal C of polar coordinates, respectively, an image edit block 9 which performs specified color edit processings on a brightness signal V, hue signal H and chroma signal C, and fourth color signal conversion unit 10 which converts the hue signal H and chroma signal C of the outputs of the image edit block 9 to the first and second color difference signals $a^*$ and $b^*$, respectively. The brightness signal V is equal in value to the brightness signal $L^*$.

The reason why the first color signal conversion unit 2 is provided is that it is very difficult to generate the respective signals V, H, C directly from the three primary signals, B, G, R and, in view of this, the three primary signals are once converted to the brightness signal L* and the first and second color difference signals a* and b* and then the signals L*, a* and b* are converted to the signals V, H, C.

The conversion of the signals L*, a* and b* to the signals V, H, C in the third color signal conversion unit 8 can be achieved by use of an arithmetic circuit or software as well. However, this conversion is a conversion from orthogonal coordinates to polar coordinates, and therefore this requires very complicated operations which include a trigonometric function and a square root. In view of this, according to the invention, this conversion is executed by use of a lookup table (LUT). And, all of the a*, b* data of 8 bits are not employed as input addresses, but only the 6 high-order bits of the respective data are employed as the input addresses. With respect to the hue signal H, a signal of 7 bits is output and, with respect to the chroma signal C, a signal of 5 bits is output. This is because, when the a*, b* data of 8 bits are converted to the signals H, C of 8 bits, the present LUT requires a very large capacity and high costs, and the conversion speed becomes slow. On the other hand, as shown in FIG. 1, when the signal H of 7 bits and the signal C of 5 bits are generated from the 6-bit a*, b* data, the LUT can be constructed at low costs and the conversion can be carried out at high speeds. In fact, it has been confirmed that the hue signal H and chroma signal C do not require 8 bits but the hue and chroma signals H and C respectively of 7 bits and 5 bits suffice for practical use.

The fourth color signal conversion unit 10 includes a lookup table (LUT) for the same reason. However, in this case, if a*, b* data respectively of 8 bits are generated directly from the hue signal H of 7 bits and chroma signal C of 5 bits, then the LUT must have a large capacity. In view of this, at first, a*, b* data respectively of 6 bits are generated and "00" is then added to the 2 low-order bits thereof to thereby generate a*, b* data each of 8 bits. Thanks to this, the fourth color signal conversion unit 10 can be made equal in both capacity and conversion speed to the third color signal conversion unit 8.

The output of the first color signal conversion unit 2 is also input to the delay unit 4, in which it is delayed by the same period of time as the processing time in the image edit unit 3 and is then input to the selector unit 5. The delay unit 4 includes a D-type flipflop (F/F) or the like and the delay time thereof is variable and, in particular, the delay time thereof may be set according to the kinds of devices to which the delay unit 4 is applied. Due to this, the delay unit 4 can be applied to other kinds of devices which have similar structures. Also, the delay unit 4 is readily adaptable when a new color edit processing is added to the image edit unit 3 and thus the edit processing time thereof is changed, and further when both the hue signal H and chroma signal C are enabled for color editing in 8 bits.

In response to a switching control signal $S_{cont}$ output from the image edit block 9, the selector unit 5 operates to apply to the second color signal conversion unit 6 either outputs from the color-edited L*, a*, b* respectively output from the image edit unit 3 or the L*, a*, b* respectively output from the delay unit 4. Here, since the image edit block 9 outputs the switching signal $S_{cont}$ on condition that a specified color has been detected in a specified edit area, with respect to pixels on which color edit unit 3 is output from the selector the output of the image edit unit 3 is output from the selector unit 5 and, with respect to pixels on which no color edit processings are performed, the output of the delay unit 4 is output from the selector unit 5. Therefore, while the color edit processings are performed on the brightness signal V of 8 bits, hue signal H of 7 bits and chroma signal C of 5 bits, with respect to the pixels on which no color edit processings are performed, the image data that is read is output as it is, so that a faithful image can be reproduced.

The output of the selector unit 5 is converted to the toner color signals Y, M, C, K by the second signal conversion unit 6 to be than supplied to the image output unit 7 where hard copies are produced.

As described above, according to the present invention, due to the fact the three primary color signals B, G, R are converted to the brightness signal V, hue color signal H and chroma signal C to thereby perform color edit processings, it is very easy to set a color for color editing and also the accuracy of the color setting can be improved.

BRIEF DESCRIPTION OF THE DRAWINGS

In the attached drawings:

FIG. 8 is an explanatory diagram showing the structure of a logic table employed in the invention;

FIG. 10 is an explanatory diagram showing TSEL data employed in the invention;

FIG. 11 is an explanatory view showing MUL data employed in the invention;

FIG. 12 is an explanatory diagram showing CCSEL data employed in the invention;

FIG. 13 is an explanatory diagram showing NEG data employed in the invention;

FIG. 14 is an explanatory diagram showing a negative-positive inversion processing according to the invention;

FIG. 15 is an explanatory diagram showing TYPE data employed in the invention;

FIG. 16 is an explanatory diagram showing FUL data and MON data respectively employed in the invention;

DESCRIPTION OF THE PREFERRED EMBODIMENTS

An embodiment of the present invention will be described with reference to the accompanying drawings. In the illustrated embodiment, the invention is applied to a color copying machine. However, it should be noted that there is no intent to limit the invention to this, but it can also be applicable to a color printer and other similar apparatus.

Figure 1:
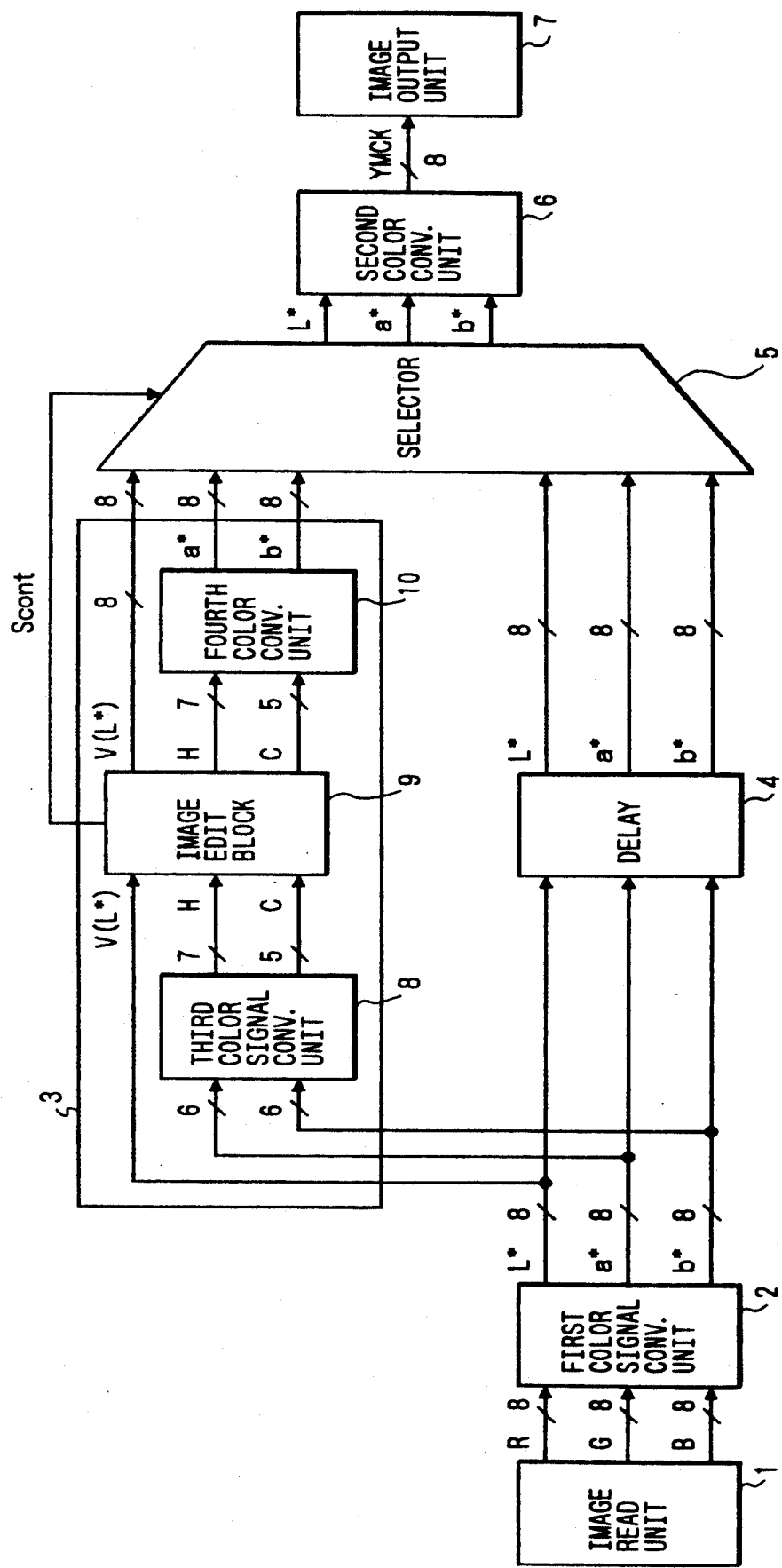
FIG. 1 is a block diagram showing the structure of an embodiment of a color image recording device according to the present invention.
Figure 2:
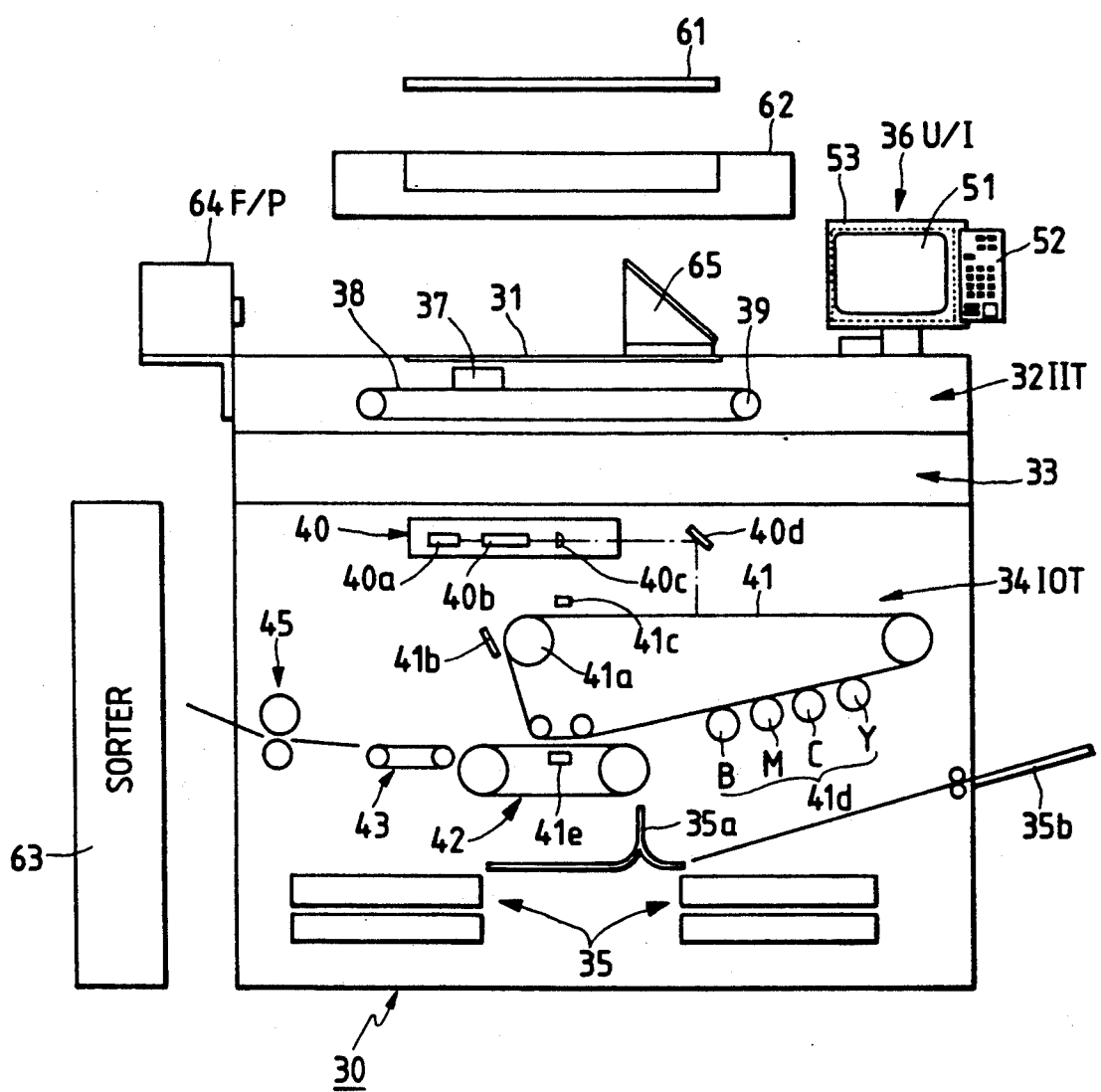
FIG. 2 is a schematic view of the structure of a color copying machine of the invention.

In FIG. 2, there is shown a schematic view of the structure of a color copying machine to which the invention is applied. In this figure, a base machine 30 includes a platen glass 31 on the upper surface of which a original document is placed, an image input terminal (IIT) 32, an electric system control storage part 33, an image output terminal (IOT) 34, a paper tray 35, and a user interface (U/I) 36. Also, the base machine 30 further includes, as an optional device, a film image read device which comprises an edit pad 61, an auto document feeder (ADF) 62, a sorter 63, a film projector (F/P) 64, and a mirror unit (M/U).

The IIT 32 comprises an imaging unit (I/U) 37, a wire 38 and a drive pulley 39 respectively used to drive I/U 37, and the like. The IIT 32 separates an image into the three primary colors of light B, G, R by a color filter provided in I/U 37, converts the image information on a color original document that is read by a CCD line sensor into digital image data of multi-gradation B, G, R and outputs the multi-gradation digital image data B, G, R to the image processing system (IPS).

The IPS, which is accommodated in the electric system control storage part 33, receives the image data B, G, R and performs various kinds of processings such as various kinds of conversion, correction processings, edit processings and the like in order to improve the color, gradation, quality of a picture image such as fineness and the like, and reproducibility. In summary, the IPS converts the image data into toner color signals Y, M, C, K, and further converts a gradation toner signal of a process color into an on/off binary toner signal to be applied to an IOT 34.

The IOT 34 which includes a scanner 40 and a sensitive belt 41, converts the image data into light signals in its laser output part 40a to form on the sensitive belt 41 a latent image corresponding to the original document image through a polygonal mirror 40b, and F/θ lens 40c and a reflection mirror 40d. The latent image is transferred to a paper delivered from the paper tray 35 and then the paper is discharged as a color copy. In the IOT 34, the sensitive belt 41 is driven by a drive pulley 41a, adjacently to them there are disposed a cleaner 41b, a charger 41c, developers 41d respectively used for Y, M, C, K, and a transfer member 41e, and there is provided a transfer device 42 in such a manner that it is opposed to the transfer member 41e. And, the IOT 34 holds the paper when it is fed from the paper tray 35 through a paper feed passage 35a and, for a 4-color full color copy, rotates the transfer device 42 four times to transfer the respective latent images of Y, M, C, K to the paper, feeds the paper from the transfer device 42 through a vacuum feed device 43 to a fixing device 45, fixes the paper in the fixing device 45, and then discharges the paper. An SSI (a single sheet inserter) 35b is adapted to be able to selectively supply the paper to the paper feed passage 35a under manual control.

Referring to a U/I 36, a user can select a desired function thereof and can instruct the execution condition thereof. The U/I 36 includes a color CRT display 51 and a hard control panel 52. When an infrared touch board 53 is combined with them, then the user can instruct the U/I 36 directly by unit of a soft button provided on the screen of U/I 36.

The electric system control storage part 33 is used to store a plurality of control substrates respectively constructed by processing units of the above-mentioned IIT 32, IOT 34, U/I 36, IPS, F/P 64 and the like, circuit substrates respectively for controlling the operations of the mechanisms of IOT 34, ADF 62, sorter 63 and the like, and a circuit substrate for controlling the whole of these substrates.

Figure 3:
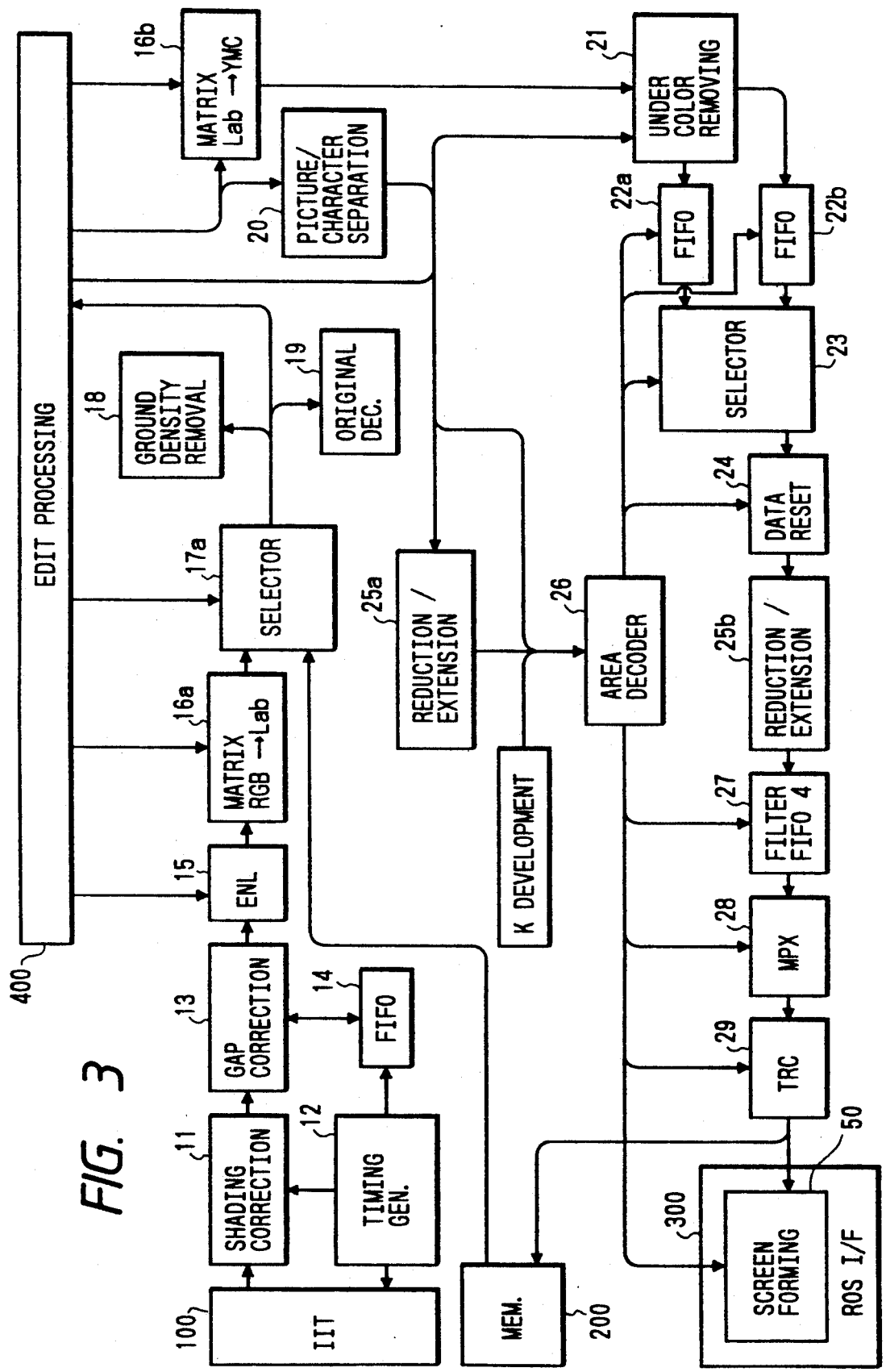
FIG. 3 is a block diagram showing the structure of a signal processing system employed in the color copying machine shown in FIG. 2.

Now, in FIG. 3, there is shown a block diagram of a structure of a signal processing system of the color copying machine shown in FIG. 2. In FIG. 3, an image input part (IIT) 100 includes a reduced-type sensor which consists of three CCD line sensors B, G, R respectively disposed at right angles to the sub-scanning direction. While moving in the sub-scanning direction at a speed corresponding to the reduction/extension ratio, the IIT 100 scans in the main scanning direction in synchronization with a timing signal from a timing generation circuit 12 to read the image. The image data B, G, R that are read by the IIT 100 are processed to provide digital image data of a given number of bits, for example, 8 bits, are shading corrected in a shading correction circuit 11 with respect to variations between the respective pixels due to various causes, are then gap corrected in a gap correction circuit 13 with respect to gaps between the respective line sensors. The reason why the gap correction is made is to delay the image data read correspondingly to the gaps by an FIFO 14 to obtain at the same time the image data B, G, R existing in the same position.

An ENL (Equivalent Neutral Lightness) 15 is used to carry out a grey balance operation and includes a plurality of LUTs in which output densities with respect to input densities are written for each of the primary color signals B, G, R. Which one of the plurality of LUTs is used is determined by a NEGA signal or a TYPE signal which is notified by an edit processing part 400.

The image data B, G, R that have been grey balance processed are converted into an equivalent color space brightness signal L*, a first color difference signal a*, and a second color difference signal b* by a matrix circuit 16a. In the matrix 16a, a coefficient for use in converting the image data B, G, R into L*, a*, b can be changed according to the TYPE signal notified by the edit processing part 400.

A selector 17, which is controlled by an ESS signal notified form the edit processing part 400, takes out selectively image data from the output of the matrix circuit 16a or from a memory system 200 which is an external memory, and synthesizes or composes the outputs from the matrix circuit 16a and the image data from the memory system 200. Also, the selector 17 compares the densities of the respective pixels of the input image data with a predetermined threshold value and, if the pixel density is equal to or greater than the threshold value, then notifies the edit processing part 400 of a TEX signal (1 bit).

Now, a grounding density removal circuit 18 makes up a histogram of an original document density in a pre-scanning operation or in a similar operation to thereby detect a grounding density and, with respect to the pixels that have a density lower than the grounding density, processes such density to become zero so as to be able to improve the quality of a copy with respect to the original document. An original document detect circuit 19 detects a boundary between the back surface of a black platen and the original document to find a circumscribed rectangle, whereby it detects and stores the size of the original document.

The image data, which are input from the selector 17 into the edit processing part 400 and are color edited there, are then input into a matrix circuit 16b which is used to convert L*, a*, b* into toner colors Y, M, C. When a control signal indicating that a mono color is set is notified form the edit processing part 400, then the matrix circuit 16b allows L* to pass therethrough.

An under color removal circuit 21 performs the following operations in accordance with a control signal notified from the edit processing part 400: that is, when a control signal representing that a character mode is set is notified from the edit processing part 400, then the circuit 21 outputs L*, which is input from the matrix 16b, to an FIFO (First In First Out Memory) 22b and, in other cases, the circuit 21 generates K from Y, M, C input from the matrix 16b and also generates new Y, M, C, and it further outputs image data of a process color to FIFO 22a.

The image data that are color edited in the edit processing part 400 are also input to a picture/character separation circuit 20, in which they are discrimination in a color character, a black character and a picture for each of predetermined areas in accordance with a difference between the spatial frequencies thereof.

An area decoder 26 decodes the control signal notified from the edit processing part 400, the output signal of the picture/character separation circuit 20 and the output signal of a reduction/extension circuit 25a and then distributes them to FIFO 22a, selector 23, data reset circuit 24, filter 27, multiplier 28, TRC 29 and screen generating part 50.

The selector 23, in accordance with a control signal from the area decoder 26, selects and outputs either of FIFO 22a of FIFO 22b.

The data reset circuit 24, in accordance with a control signal from the area decoder 26, makes valid or invalid the image data that is input according to the process colors. For example, if a job is selected which copies only the black characters in the original document, then the image data may be given to IOT 300 only during processing of K. Therefore, in this case, there is notified from the area decoder 26 a control signal to the effect that the image data is made valid only in the K processing, with the result that the data reset circuit 24 makes valid the character data input from the selector 23 and allows the same to pass therethrough. In the other hand, during processing of other toner colors Y, M, C, the data reset circuit 24 makes invalid the image data input and then outputs the data that represents a density of 0. By unit of such operations, there can be obtained an image of a black character which is not muddled.

The reduction/extension circuit 25a is used to reduce or extend an edit command in order to prevent shifting of the execution area of the area control information on the image data even when the area control information is reduced or extended. And, the area control information reduced or extended as required in the reduction/extension circuit 25a is then decoded by the area decoder 24 and is then output for processings in the respective parts. The reduction and extension of the edit command in the reduction/extension circuit 25a is achieved by reducing or extending the area of an edit command having the same value in the main scanning direction. In this manner, the reduction/extension circuit 25a is adapted to perform a simple reduction/extension operation and, therefore, it is able to reduce or extend any edit commands with no complicated control involved.

Another reduction/extension circuit 25b is used to reduce or extend the image data, which is a multi-value signal, in the main scanning direction by unit of interpolation between two points. It should be noted that, because the reduction/extension circuit 25b is disposed downstream of the color edit processing part, the image data to be input is only one of the Y, M, C or K image data corresponding to the process color. For this reason, the reduction/extension circuit 25b may include only one system and thus it can be constructed at low costs.

The filter 27 is a space filter in which various kinds of filter characteristics can be set when coefficients are set, and the coefficients can be set in accordance with control signals which are notified from the area decoder 26. For example, if a character mode is set, then there is set in accordance with the control signal a coefficient which provides a high-pass filter characteristic, whereby the edge is emphasized. On the other hand, if a photographic mode or the like is set, then there is set a coefficient which provides a low-pass filter characteristic.

The multiplier 26 includes a table in which coefficients used to multiply the image data as to predetermined 16 colors are written by Y, M, C. The multiplier 26 performs a computational processing to multiply the image data by the coefficient of the mono color specified by a control signal from the area decoder 26 for each process color with reference to the table. That is, if a monochromatic color is set, as described above, the brightness signal L* is output from the matrix 16b and is then input through the under color removal circuit 21, FIFO 22b, and selector 23 - filter 27 into the multiplier 28. However, assuming that a job to output a mono color of green is set and in the above-mentioned table there are written a coefficient of 100% for both Y and C and a coefficient 0% for both M and K with respect to the mono color of green, then the multiplier 28 allows the brightness signal L* input to pass therethrough during processing of Y and C, while the multiplier 28 makes the image data zero during processing of M and K. This enables the brightness signal L* to be copied in unmuddy green.

A TRC 29 is used to adjust the densities according to the characteristics of IOT 300 and is composed of a LUT in which the output densities with respect to the input densities are written. The LUT to be used can be switched every process in accordance with a control signal from the area decoder 26. Also, an output switching control whether the output is fed to a memory system 200 or to IOT 300 is also carried out in accordance with a control signal from the area decoder 26.

The screen generating part 50 is used to generate a dot image from the image data that has a density value.

Figure 4:
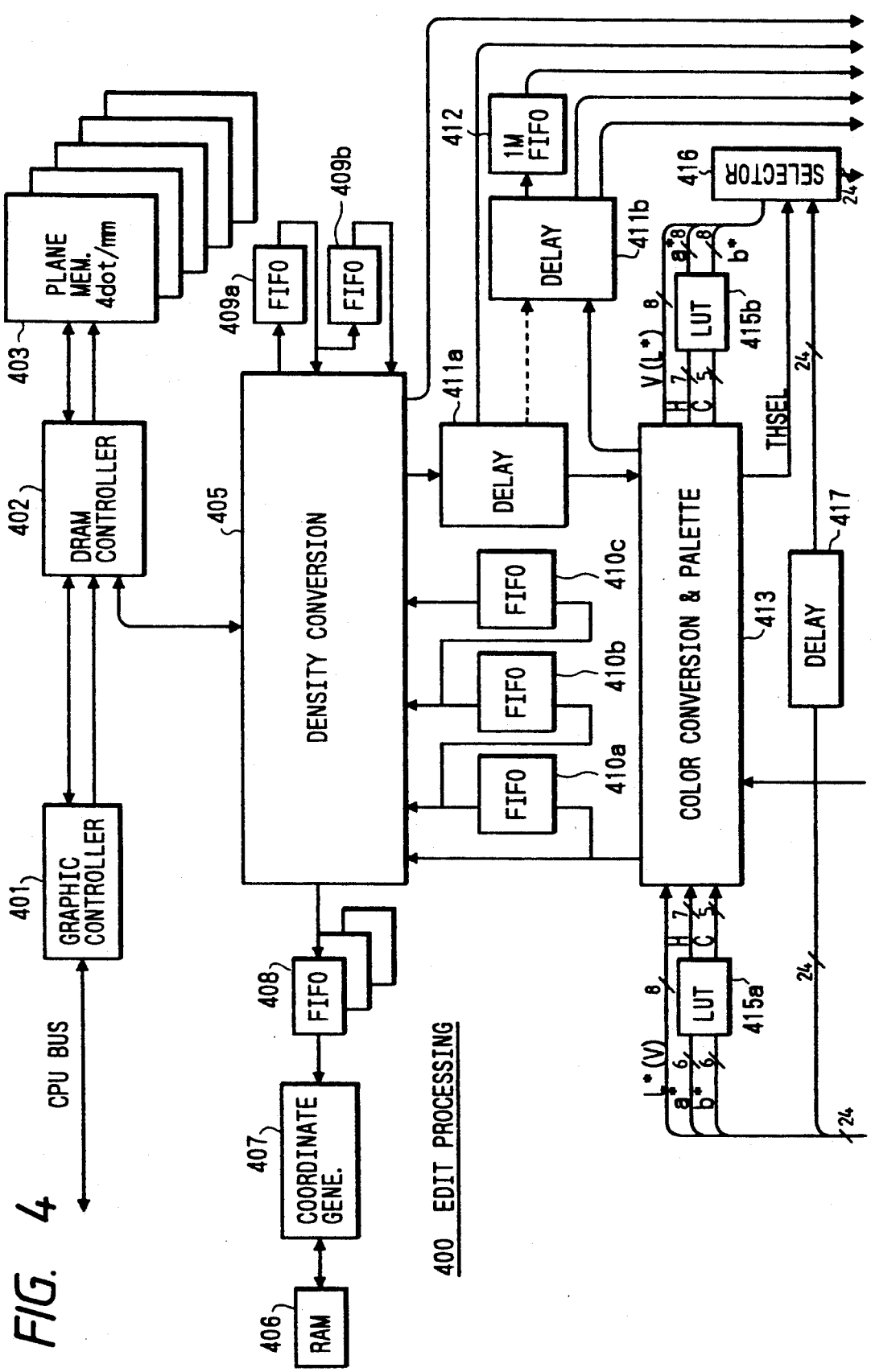
FIG. 4 is a block diagram of the structure of an edit processing part employed in the invention.

The edit processing part 400 is used to perform processings such as color conversion, color editing, area generation and the like, and an embodiment of the structure of the edit processing part 400 is shown in FIG. 4.

The three pieces of image data L*, a*, b* each of 8 bits, a total of 24 bits, respectively output from the selector 17 are delayed by a delay circuit 417 by a time necessary for color edit processing in a color conversion & palette circuit (which is hereinafter referred to as a color conversion circuit simply) 413 and are then input to a selector 416. Also, while the data L* is input, as it is, into the color conversion circuit 413 as a brightness signal V, with respect to the data a* and b*, only 6 high-order bits thereof are employed as the input addresses of LUT 415 and a hue signal of 7 bits and a chroma signal of 5 bits are output. As described above, this is done in order to facilitate the color edit processing including the color conversion, coloring and the like.

The color conversion circuit 413, in accordance with an edit command which is input through a delay circuit 411a from a density conversion/area generation circuit (which is hereinafter referred to as a density conversion circuit simply), performs various color edit processings on the image data L*, H, C. And, among the image data that have been color edited, the brightness signal V of 8 bits is input as it is into the selector 416, while the hue signal H of 7 bits and chroma signal C of 5 bits are input to LUT 415b, in which they are converted to a first color difference signal a* of 8 bits and a second color difference signal b* of 8 bits, respectively. However, it should be noted that LUT 415b does not convert the signals H, C directly to the signals a*, b* each of 8 bits but LUT 415b outputs the signals a*, b* each of 6 bits and then "00" is added to the 2 low-order bits thereof to provide the data of 8 bits. The LUT 415a and LUT 415b can be constructed to be identical with each other in both capacity and structure.

A THSEL signal is fed from the color conversion circuit 413 to the selector 416 and, in accordance with the THSEL signal, it is determined which of the outputs of the LUT 514b and delay circuit 417 is selected and output. The THSEL signal will be described later. And, the output of the selector 416 is transmitted to the matrix circuit 16b shown in FIG. 3.

Figures 5, 6:
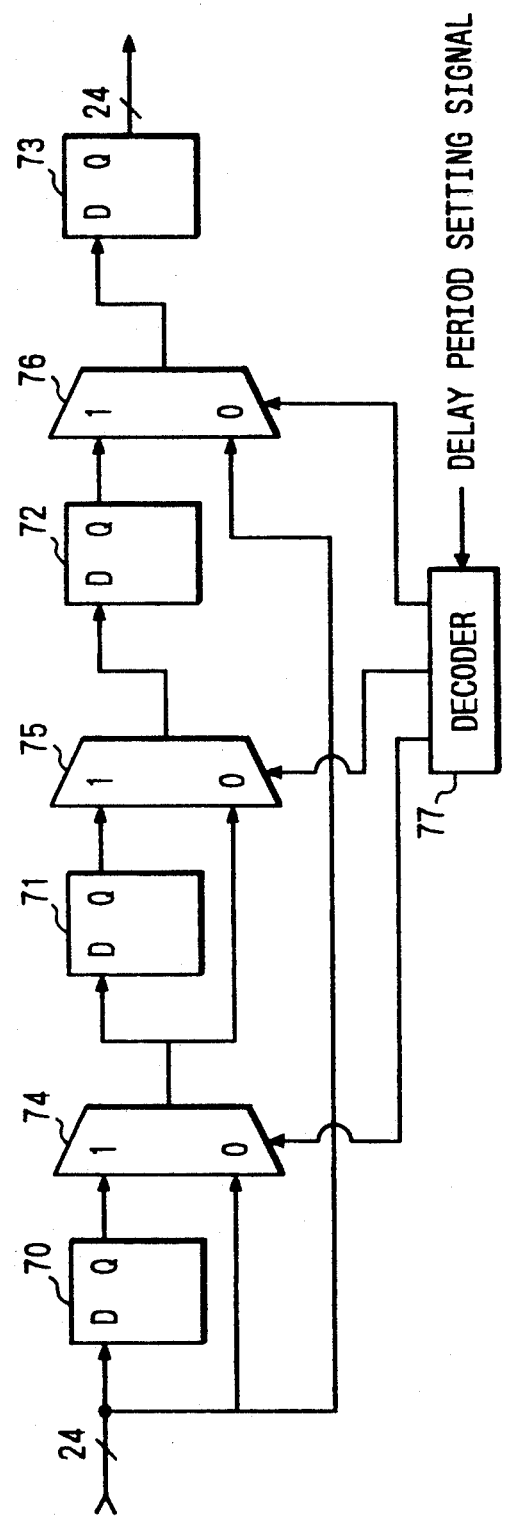
FIG. 5 is a block diagram of the structure of a delay circuit employed in the invention.
FIG. 6 is an explanatory diagram showing the structure of a table included in a density conversion/area generation circuit employed in the invention.

Here, the delay circuit 417 includes a variable delay circuit as shown in FIG. 5, for example. In FIG. 5, reference numerals 70–73 designate D-type F/Fs as delay elements, respectively, 74–76 stand for selectors, respectively and 77 points out a decoder. If 1 is given from the decoder 77, then the respective selectors 74–76 select and output signals which are input from the F/Fs and, if 0 is given, then the selectors select and output other input signals. Therefore, by specifying the signals to be selected by the selectors by unit of a delay time setting signal input to the decoder 77, a desired delay time can be obtained. This is important because there is a possibility that the kinds of the color editing processings in the color conversion circuit 413 may be changed in the future and, in this case, it is also necessary to change the delay time required in the delay circuit 417. Also, in the LUTs 415a and 415b as well, there is a possibility that the number of bits to be converted or the conversion speed may be changed and, in that case, it is necessary to change the delay time in the delay circuit 417. Even in these cases, as shown in FIG. 5, according to the illustrated embodiment of the invention, the delay time can be changed to a desired one by use of the delay time setting signal of the delay circuit 417 so as to be able to cope with the variable color edit processings and the like in the future.

For the color editing, it is necessary for the user to set an area in which the color edit processing is performed. As the methods for setting the area, there are prepared a method in which an original document is put on an edit pad 61 to thereby indicate a desired position; a method in which a desired closed area is drawn on the original document with a marker pen of a given color; and, when a closed area in a original document image is painted with a desired color, a method in which an arbitrary position in the closed area is indicated by the edit pad 61 or one point is indicated with a marker pen. And, the coordinate data of the area indicated by the edit pad 61 is transmitted from CPU (not shown) through a graphic controller 401 and DRAM controller 402 to a plane memory 403, in which a pattern of the area set is written. Also, the coordinates of the point indicated by the edit pad 61 are written into RAM 406 through the graphic controller 401, DRAM controller 402, density conversion circuit 405, FIFO 408 and coordinates generation circuit 407.

The plane memory 403 is composed of 4 plane memories each having a pixel density of 100 spi, in which each plane is allocated 1 bit and thus each area is represented by a code of 4 bits, so that 16 areas can be identified. The edit pad 61 is arranged such that it has a pixel density of 100 spi.

The pattern of the closed area drawn in the marker color is read during the scanning time, is transmitted from the color conversion circuit 413 to the density conversion circuit 405, in which the density of the pattern is converted from 400 spi to 100 spi. In this conversion, the density conversion circuit 405 uses FIFOs 410a, 410b, 410c to perform a pixel density conversion in a window of 4×4 by executing a binary-coded processing that, if pixels which have density values more than predetermined values are present in a number equal to or larger than a predetermined number in the 16 pixels, then it is represented by "1". The area pattern the density of which has been converted is written through DRAM controller 402 into the plane memory 403. And, the respective area patterns written into the plane memory 403 are respectively given 4-bit codes sequentially, for example, in accordance with the registered sequence of the areas. The 4-bit codes also serve as edit commands to identify the edit processings respectively set in the respective areas, and are further used as area commands (ACMD) which will be described later.

The above-mentioned pixel density conversion is carried out on the point coordinates indicated by the marker color as well. That is, the values of the coordinates are generated in the coordinates generation circuit 407 and are then written into RAM 406. FIFO 408 delays the conversion processing time by 8 lines to produce a window of 9×9 to thereby detect the size of the dot, in order to eliminate the possibility that small dust, small marker loop or the like on the original document can be detected by mistake as the marker dot. The marker dot is also stored in the plane memory 403, while this processing by FIFO 408 is performed in order to prevent wrong detection.

The areas of the point set by the edit pad 61 are written as they are into the plane memory 403. On the other hand, as described before, the sub-scanning speed of IIT 100 in the copy scanning operation is set as the speed that corresponds to the reduction/extension rate set. For this reason, at the time when the image data are input into the color conversion circuit 413, the coordinates values of ACMD read out from the plane memory 403 are identical with the image data in the main scanning direction but are different from the positions of the image data in the sub-scanning direction. In view of this, when reduction/extension rates other than 100% are set, then the coordinates values in the sub-scanning direction set by the edit pad 61 are multiplied by the set reduction/extension rate to thereby allow the positions of ACMD read out from the plane memory 403 to be identical with the positions of the image data. This multiplying processing is performed by the graphic controller 401. As a result, the area to be written into the plane memory 403 provides the values that have been corrected in the sub-scanning direction according to the reduction/ extension rate, so that the edit processings can be executed regardless of the reduction/extension rate.

The 4-bit command stored in the plane memory 403 is read out synchronously with the output of the image data in the copy scanning operation, and is then input through DRAM controller 402 into the density conversion circuit 405. As will be described later, the density conversion circuit 405, in accordance with ACMDs input therein, reads out information on the edit processings set in the respective ACMDs out of a table included therein, and notifies necessary information to the color conversion circuit 413 and to various circuits shown in FIG. 3. To read out such ACMDs from the plane memory 403 and use them for the edit processings in the color conversion circuit 413 and parameter switching processings in the image data processing system, it is necessary to convert the density from 100 spi to 400 spi and the density converting processing is performed by the density conversion circuit 405. For this purpose, in the density conversion circuit 405, FIFOs 409a and 409b are used to provide a block of 3×3 and data interpolation is conducted from the pattern thereof, whereby the density is converted from 100 spi to 400 spi in such a manner that the closed loop curve, edit area and the like provide a smooth boundary respectively. Delay circuits 411a, 411b, FIFO 412 and the like are used to adjust a timing between the image data and the information to be notified to the respective parts.

By the way, when making a copy, the user must perform various kinds of settings which include: setting of a color mode as to whether the copy is made in full colors or in a mono color; setting of a color in the mono color to be output when the copy is made in the mono color; setting of the kind of the image data to be copied depending on whether the image data read by IIT 100 is to be copied, the image data stored in the memory system 200 is to be copied, or these image data are synthesized or composed together; setting of the kind of synthesization if the image data are synthesized; setting of the type of the original document as to whether the original document is a character original document or a photographic original document; setting of the type of copying depending on whether a normal copying is made or a negative-positive copying is made; and other settings. These setting are input from U/I 36 and the information on the copy jobs set by the user is fed from CPU and is written into the table of the density conversion circuit 405. In FIG. 6, there is shown an example of the structure of the table, in which the respective data LOGIC, TSEL, MUL, CCSEL, NEG, TYPE, FUL, MON, ESS are written into one setting area. Therefore, if ACMDs read out from the plane memory 403 are input sequentially in synchronization with the image data, then the density conversion circuit 405, with ACMD input therein as the input address of the table, reads out the information set in an area corresponding to the present ACMD and notifies the information to the color conversion circuit 413 and other circuits.

Figure 7:
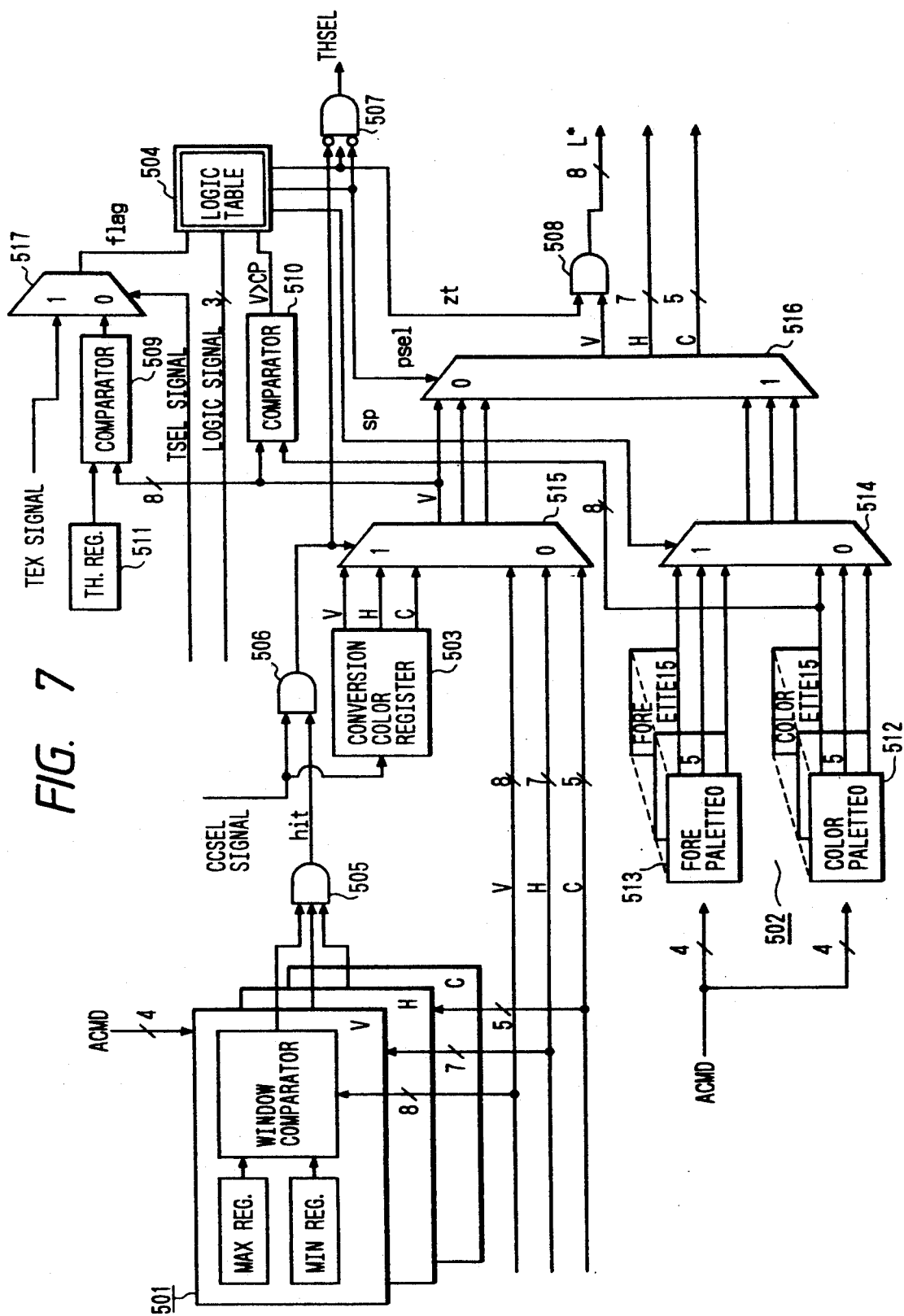
FIG. 7 is a block diagram of the structure of a color conversion and palette circuit employed in the invention.

Next, description will be given of the structure of the color conversion circuit 413 with reference to FIG. 7. FIG. 7 is a view to show the portion of the color conversion circuit 413 that relates to the present invention. In FIG. 7, reference numeral 501 designates a window comparator, 502 a palette, 503 a converted color register, 504 a logic table, 505–508 AND gate circuits, 509, 510 comparators, 511 a threshold value setting register, 512 a color palette, 513 a fore palette, and 514–516 selectors, respectively. Although not shown in FIG. 7, with respect to H, C which are the outputs of the selector 516, there are provided AND gate circuits which are respectively similar to the AND gate circuit 508 and the outputs of which can be controlled in accordance with a signal zt signal from the logic table 504.

The window comparator 501 is a table in which there are written the ranges of the colors extracted from the image data such as the color to be converted in the color conversion step. In the table, there are written a maximum value and a minimum value in each of setting areas which determine the range of extraction with respect to the respective outputs V, H, C. Of course, these data are those which have been set by the user in U/I 36. For example, when extracting a red color with respect to a certain area, the ranges of the brightness, hue and chroma of the red color to be extracted are written into the addresses that correspond to the relevant area in the window comparator 501. And, with ACMD as an input address, the extraction range set in the relevant area is read out to be compared with the image data input and, only when all of the outputs V, H, C are in the extraction range that is set in the window comparator 501, a hit signal is output from the gate circuit 505.

The palette 502 can be used in a coloring edit processing and includes two palettes which are the color palette 512 and fore palette 513. The color palette 512 and fore palette 513 have a table which defines preset 16 colors by use of V, H, C, and which of the color data is output is determined in accordance with the ACMD data. Whether the color data is read out from the color palette 512 or from the fore palette 513 depends on the contents of the color editing processing. The color palette 512 and fore palette 513 respectively outputs 8 bits for the brightness V, 7 bits for the hue H, and 5 bits for the chroma. Due to this, the palette 502 is provided with a memory having a small capacity.

The converted color register 503 is used in the color conversion editing and, in the converted color register 503, there are written the values of V, H, C with respect to the respective preset four colors.

The logic table 504 inputs a flag from the selector 517, a LOGIC signal, and the output of the comparator 510 and outputs an sp signal for controlling the switching of the selector 514, a psel signal for controlling the switching of the selector 516 and a zt signal. In FIG. 8, there is shown a relationship between the input and output of the logic table 504. The comparator 510 compares the V output of the selector 515 with the V output of the color palette 512 to output 1 when the V output of the selector 515 is greater. Also, the selector 514, when the sp signal is 1, then selects and outputs a signal for which "1" is stated in FIG. 8, in this case, the data from the fore palette 513 and, when the sp signal is 0, then selects and outputs a signal for which "0" is stated in FIG. 8, in this case, the data from the color palette 512. The selectors 515 and 516 respectively operate similarly to the selector 514.

Next, description will be given of the flow of the data shown in FIG. 6 and the operation of the structure shown in FIG. 7.

Figure 9:
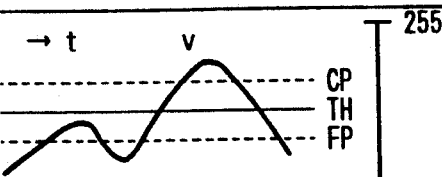
FIG. 9 is an explanatory diagram showing LOGIC data employed in the invention.
Figure 9:
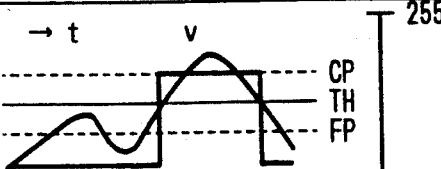
Figure 9:
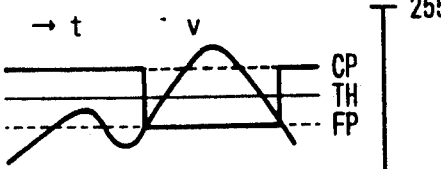
Figure 9:
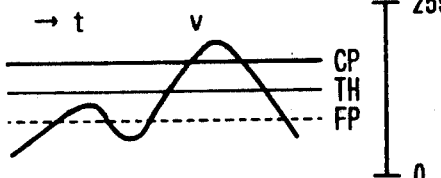
Figure 9:
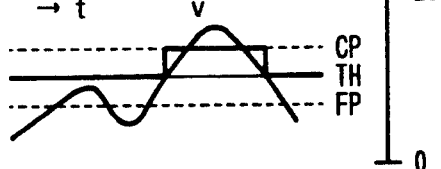
Figure 9:
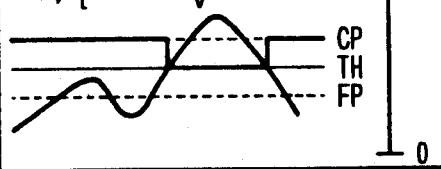

LOGIC data are the data that are used to specify the kinds of edit processings (annotation) relating to the coloring shown in FIG. 9, the TSEL data are the data that are used to specify the annotation as well as the character synthesization or composition.

In the case of a normal copy in which no annotation is indicated, LOGIC are all 0 and thus, as shown in FIG. 8, there are obtained psel=0, zt=1, and sp=0. Further, at that time, the output of the gate circuit 506 is 0 and, therefore, V, H, C are allowed to pass through the color conversion circuit 413, but the THSEL signal output from the gate circuit 507 becomes 1, with the result that the selector 416 (shown in FIG. 4) selects the outputs the output of the delay circuit 417. In other words, in the color conversion circuit 413, the image data L*, a*, b* respectively of 8 bits are processed by use of the image data V, H, C of a total of 20 bits and, thereof, the resultant faithfulness with respect to the original document image is inferior to that of the image data L*, a*, b*. However, as the result of the above operation, with respect to the pixels on which no color edit processing is performed, the image data L*, a*, b each of 8 bits are selected to be able to obtain a faithful image to the original document image.

When the character coloring is selected as the annotation, then there is obtained TSEL=0 and, therefore, the selector 517 selects the output of the comparator 509 and, since LOGIC=001 is obtained and also since sp=0 is obtained from FIG. 8, the selector 514 selects the output of the color palette 512. And, at that time, as the output of the gate circuit 506 is 0, the image data V, H, C input are allowed to pass through the selector 515. However, V is compared with the threshold value TH in the comparator 509 and, if the value of V is equal to or greater than the threshold value, then there is obtained flag=1. On the other hand, if the value of V is smaller than the threshold value, then flag=0 is obtained. If flag=1, then there is obtained psel=zt=1, with the result that the predetermined color data V, H, C read out from the color palette 512 are output. On the other hand, if flag =0, then psel=zt=0 and thus the output of the selector 516 is inhibited in the gate circuit 508, with the result that the values of V are made 0. At that time, as TSEL=0 is obtained, then the selector 416 selects the output of the color conversion circuit 413. This enables the character part (foreground; f.g.) of a desired area of the original document image to be colored in the color that is set in the color palette 512 and the background part (b.g.) other than the character part to be made colorless. That is, only the character part can be colored in a desired color.

When a decoloration character is selected as the annotation, then there is obtained psel=zt=1 and, therefore, the selector 516 always selects the output of the palette 502 and, as TSEL=0, the selector 517 selects the output of the comparator 509. And, at that time, as the output of the gate circuit 506 is 0, the image data V, H, C input are allowed to pass through the selector 515 while V is compared with the threshold value TH in the comparator 509. If the value of V is equal to or greater than the threshold value, then flag=1 is obtained and, if it is smaller than the threshold value, then flag=0. When flag=1, then there is obtained sp 1, so that the selector 514 selects the predetermined color data V, H, C that are read out from the fore palette 513. On the other hand, if flag=0, then sp=0, so that the selector 514 selects the predetermined color data that are read out from the color palette 512. At that time, as THSEL=0, the selector 416 selects the output of the color conversion circuit 413. In this manner, the character part and background can be colored entirely and uniformly in the desired colors, respectively.

When paint is selected as the annotation, then there are obtained psel=zt=1 and sp=0, so that the predetermined color data V, H, C read out from the color palette 512 are always output. At that time, as THSEL=0, the selector 416 selects the output of the color conversion circuit 413. Due to this, the area that is set can be colored uniformly in a desired color.

When coloring is selected as the annotation, then zt=1 and sp=0 are obtained, so that the selector 514 selects the output of the color palette 512. Also, as TSEL=0, the selector 517 selects the output of the comparator 509. At that time, since the output of the gate circuit 506 is 0, the image data V, H, C that are input are allowed to pass through the selector 515, while V is compared with the threshold value TH in the comparator 509. If the value of V is equal to or greater than the threshold value, then flag=1 and, if it is smaller than the threshold value, then flag=0. And, in the case of flag=1, psel=0 is obtained, so that the selector 516 selects the image data that is transmitted from the selector 515. On the other hand, in the case of flag=0, psel =1 is obtained, so that the selector 515 selects the predetermined color data V, H, C that are read out from the color palette 512. At that time, as THSEL=0, the selector 416 selects the output of the color conversion circuit 413. Thanks to this, only the background other than the character part can be colored in a desired color.

When the character composition is selected as the annotation, then there are obtained zt=1 and sp=0, so that the selector 514 selects the output of the color palette 512. Also, as there is obtained TSEL=1 (FIG. 10), the selector selects a TEX signal. The selector 17 (FIG. 3) compares the value of the brightness V of the image data input therein with a predetermined threshold value. If the value of the brightness V is equal to or greater than the threshold value, then the selector 17 outputs TEX=1 and, in other cases, it outputs TEX=0. And, when TEX=1, the value of the flag of the selector 517 becomes 1. As flag=1 gives psel=1, then the selector 516 selects the predetermined color data V, H, C that are read out from the color palette 512. On the other hand, as flag=0 gives psel=0, then the selector 516 selects the image data from the selector 515. At that time, since there is obtained THSEL=0. then the selector selects the output of the color conversion circuit 413. Thanks to this, only the character part can be colored in a desired color.

MUL data shown in FIG. 6 are signals each of which is used to specify a mono color with respect to a set area. As shown in FIG. 11, according to values each composed of 4 bits, there are determined a through color and 15 mono colors A–O. And, the MUL data can be notified from the density conversion circuit 405 to the multiplier 28. In such notification, of course, the MUL data may be delayed properly so as to match the processing timing.

Since all of the bits of the MUL data are 0 in a normal copying operation in which setting of a mono color is not executed, the multiplier 28 is considered to be a "through" state which allows the image data to pass through the multiplier 28 and thus the image data are allowed to pass therethrough. However, when a predetermined mono color is being selected, then the MUL data having a value corresponding to the mono color is notified to the multiplier 28, so that the multiplier 28 multiplies the input image data by a coefficient to be determined by the MUL data for each process color and outputs the multiplied results. For example, if it is assumed that a multiplier coefficient A shown in FIG. 11 represents a green mono color and Y, C of the multiplier coefficient are both 100% and M, K thereof are both 0%, when the MUL data is A, then the multiplier 28 allows the input image data to pass therethrough at the time when Y and C are processed, while the multiplier 28 makes the image data zero when M and K are processed. Here, as described above, it should be noted that, for the mono color, the brightness signal L* is input to the multiplier 28.

Next, description will be given of CCESL data. The CCSEL data are the data that are used to determine converted colors when the color conversion is set in an area set in the original document, in which a through color and 7 kinds of color conversions are available, as shown in FIG. 12. As mentioned above, in the converted color register 503, there are registered four couples of conversion data (the source color and the converted color) including four kinds of color conversion A, B, C, and D which can be used independently. In addition to the independent use of these four color conversion, there are available a composite color conversion which is composed of A and B, a composite color composed of A, B and C, and a composite color composed of A, B, C and D. When a composite color conversion is specified, the color conversion is performed according to the predetermined priority order of conversions (A>B>C>D). That is, out of a total of 7 kinds of color conversions, an arbitrary conversion can be specified.

When the color conversion is not selected, then the output of the gate circuit 506 is 0. At that time, if the LOGIC data is in the through state thereof, this provides psel=0, zt=1, which results in THSEL=1. This allows the selector 416 to select the output of the delay circuit 417.

When the color conversion is selected, then all of ACMDs are read out from the plane memory 403 synchronously with the image data and further CCSEL data corresponding to the respective ACMDs are read out from the density conversion circuit 405, both of which are input to the color conversion circuit 413. In this case as well, if the LOGIC data are in the through states thereof, there are obtained psel=0 and zt=1.

In the window comparator 501, the image data V, H, C input therein are compared with the extraction range that is set in the window comparator 501. If all of the input image data V, H, C are present in the extraction range, then a hit signal is output from the gate circuit 505 and is then input into the gate circuit 506. If, in the gate circuit 506, the hit signal is 1 and the CCSEL data input from the density conversion circuit 405 is not the "through" data, then 1 is output from the gate circuit 506. Responsive to this, the selector 515 selects the outputs the output from the converted color register 503. And, at that time, the converted color register 503 outputs the data V, H, C of the color that is determined by the CCSEL data. Also, when the output of the gate circuit 506 is 1, then the THSEL signal is 0, so that the data of the converted color is output from the selector 416. In other cases, there is obtained THSEL=1, so that the selector 416 selects and outputs the output of the delay circuit 417.

Next, description will be given of NEG data. As shown in FIG. 13, the NEG data are data which are used to indicate whether a normal copying operation is performed for each of areas set or a negative-positive inverting process is performed before a copying operation is carried out. The NEG data are notified from the density conversion circuit 405 to ENL 15. As described before, ENL 15 achieves the grey balance by unit of an LUT as shown in FIG. 14A in the normal copying operation (NEG=0). However, when NEG=1 is notified, then ENL 15 generates the negative-positive inverted image data by use of an LUT having an input/output characteristic as shown in FIG. 14B and then outputs the thus generated image data. It should be noted here that, when the negative-positive inversion is set, then the THSEL signal that is the output of the gate circuit 507 is 1, so that the selector 416 selects the output of the delay circuit 417.

Next, description will be given of TYPE data. As shown in FIG. 15, the TYPE data are the data that can be used to set the types of the original document, that is, whether an area set in the original document is a standard image, a character image, an image like a photograph, or an image which includes multiple and fine colors of medium tone. Unless specially specified by the user, the standard image is set for the original document. The TYPE data are notified directly to the ENL 15 from the density conversion circuit 405, are notified to the matrix 16a through the delay 411a, and further are notified to the area decoder 26 through the delays 411a and 411b. The data that are decoded in the area decoder 26 are then notified to the filter 27, TRC 29 and the like and in the respective circuits the processings that correspond to the original document types specified are executed. For example, in ENL 15 and TRC 29, in accordance with the data notified thereto, there is selected the LUT that is best for the specified original document type; in the filter 27, there is carried out a filtering operation which corresponds to the specified original document type; and, in the matrix 16a, there is set a conversion coefficient which corresponds to the specified original document type.

Next, description will be given of FUL data and MON data. These data, as shown in FIG. 16, are used in a set of two data to indicate a original document mode for each area which is set. The data are notified through the matrix 16b and area decoder 26 to selector 23, data reset 24, multiplier 28 and the like, in which predetermined processing are executed respectively. For example, when the mono color is specified, as described before, then the matrix 16b allows only the data L* to pass therethrough, the under color removal circuit 21 similarly outputs the data L*, the selector 23 is allowed to select FIFO 22b, and the multiplier 28 multiplies the data L* by a coefficient corresponding to a mono color specified and then outputs the multiplied results.

Figures 17, 18:
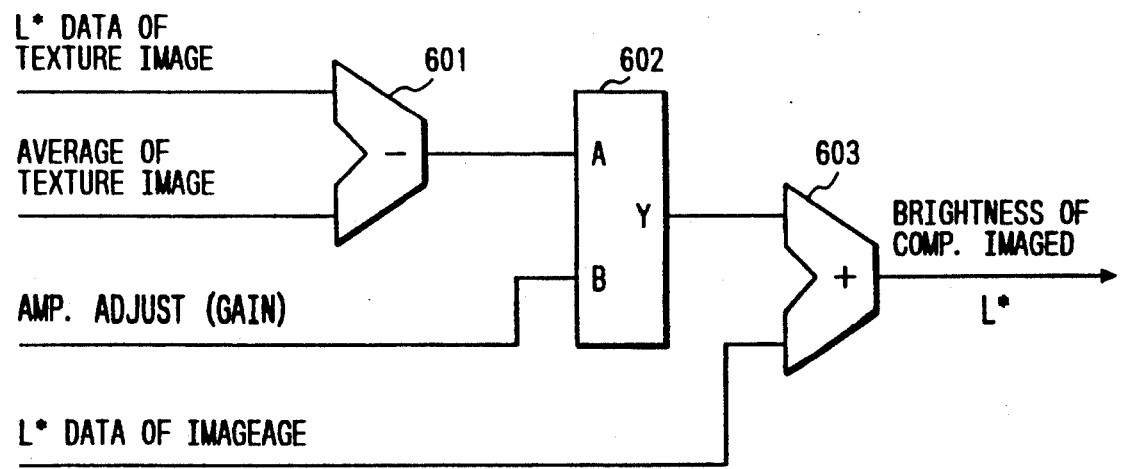
FIG. 17 is an explanatory diagram showing ESS data employed in the invention.
FIG. 18 is a schematic view of the structure of a texture composite circuit employed in the invention.

Next, description will be given of ESS data. The ESS data, as shown in FIG. 17, is used to specify whether in the selector 17 the image data read out from IIT 100 is selected, the image data read out from the memory system 200 is selected, or these two kinds of data are composed together. The ESS data are notified from the density conversion circuit 405 through the delay 411a to the selector 17. In FIG. 17, a scanner input unit that the image data read out by IIT 100 is selected and output, and an external input unit that the image data read out from the memory system 200 is selected and output.

Figure 19A:
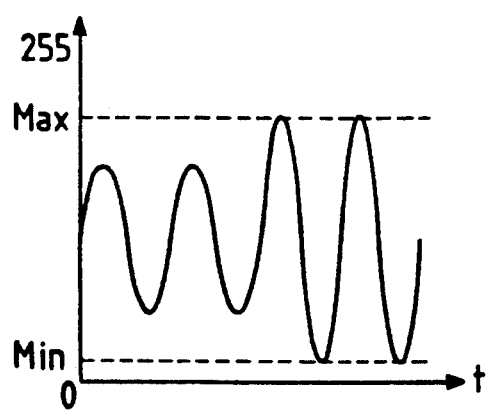
FIG. 19 is a graphical representation of an example of texture composition according to the invention.
Figure 19B:
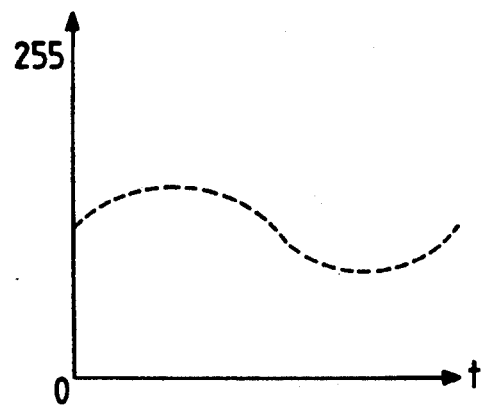
Figure 19C:
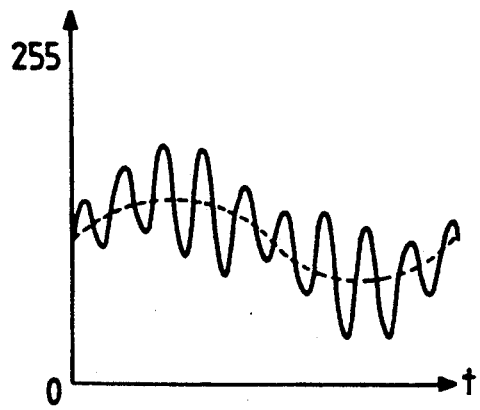

Now, description will be given below of texture composition. The selector 17 includes a composite circuit which is initiated when the texture composition is indicated. A texture image written in the memory system 200 is read out in synchronization with the scanning of IIT 100. In this case, the memory system 200 outputs the brightness data L* of the texture image and at the same time finds an average value from the maximum and minimum values of the brightness data L* of the texture image and then outputs the average value. The brightness data L* of the texture image and the average value thereof are input to a subtracter 601, in which the average value is subtracted from the brightness data L*. As a result of this, from the subtracter 601 there is output data which is an alternating component of the brightness data L* of the texture image. The output of the subtracter 601 is multiplied by an amplitude adjust value in a multiplier 602, the output of the multiplier 602 is added to the brightness data L* of an imagination image read out by IIT 100 in an adder 603, and the sum thereof is output as the brightness data L* of a composite image. Here, the amplitude adjust value is a value which is set by the user and can be set in the multiplier 602 by CPU. Also, as a* data and b* data of the composite image, there are employed a* data and b* data of the imagination image as they are. Therefore, if it is assumed now that the brightness data of the texture image written in the memory system is one as shown in FIG. 19A and the brightness data of the imagination image read by IIT 100 is one as shown in 19B, then the brightness data of the composite image obtained by the texture composition is one as shown in FIG. 19C.

Figure 20:
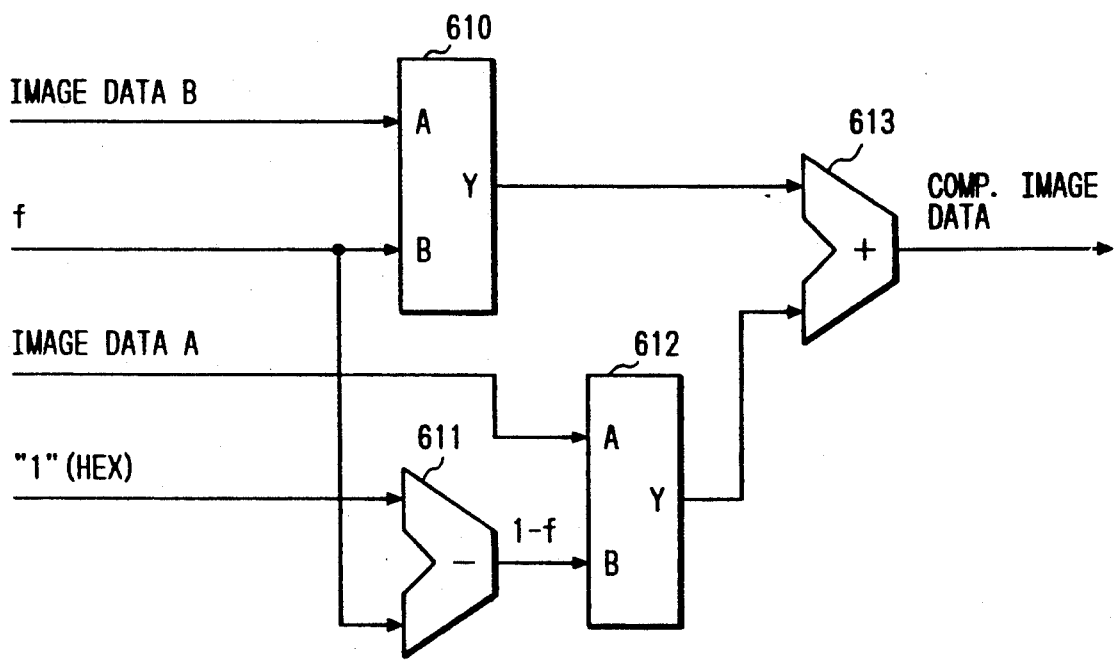
FIG. 20 is a schematic diagram showing the structure of a transparent composite circuit employed in the invention; and, FIG. 21 is a block diagram showing the structure of an image data processing system employed in a conventional digital color copying machine.
Figure 21:
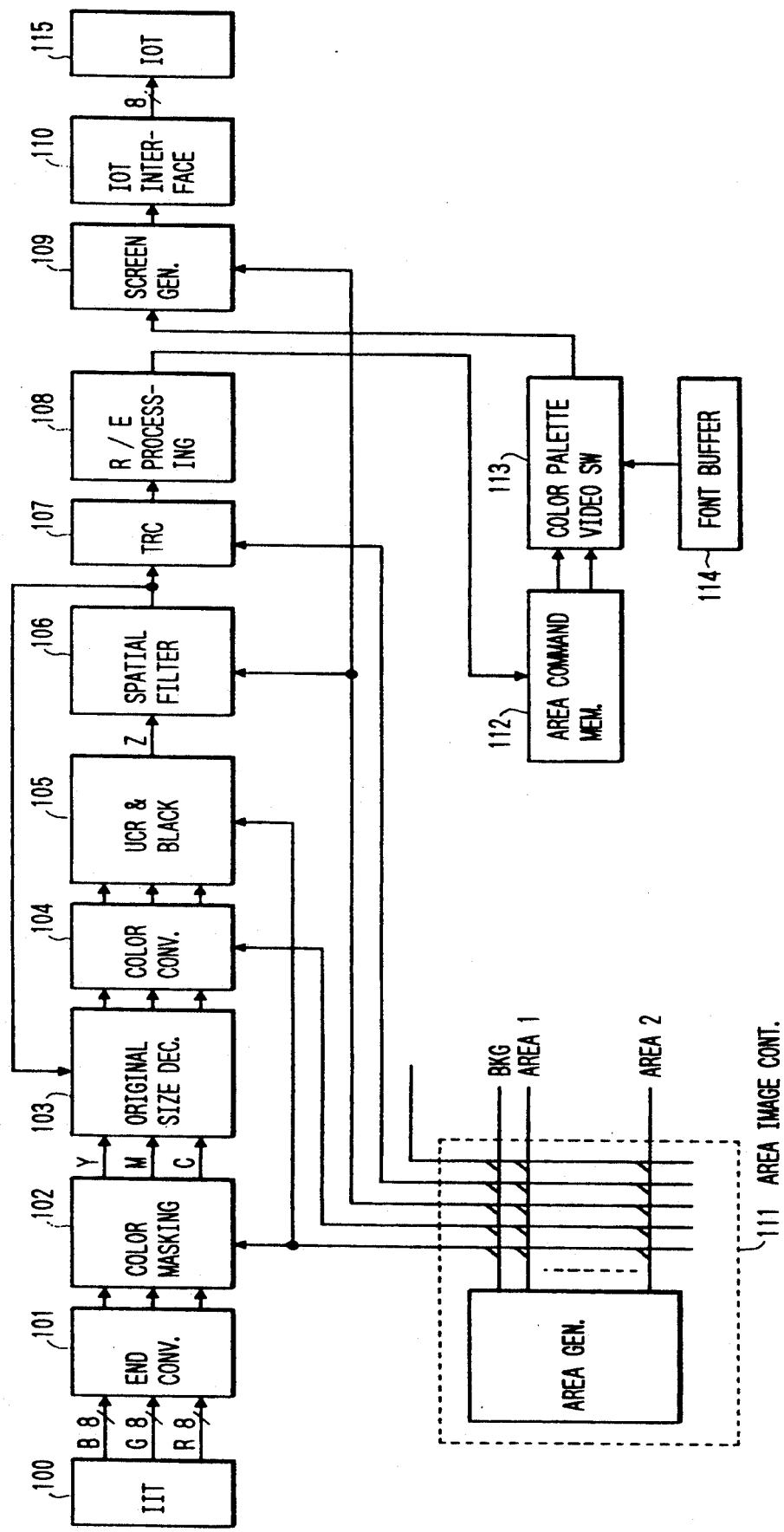

Also, transparent composition can be obtained in the following manner. The selector 17 includes a composite circuit shown in FIG. 20 with respect to the respective data L*, a*, b* and, when the transparent composition is indicated, then the composite circuit is initiated. If it is assumed now that image data read by ITT 100 is expressed as image data A and image data read out from the memory system 200 is expressed as image data B, then the image data B is multiplied by a coefficient f (0<f<1) in a multiplier 610 and the image data A is multiplied by (1-f) which is the output of a subtracter 611 in a multiplier 612. And, the output of the multiplier 610 and the output of the multiplier 612 are added to each other to thereby generate composite image data. Here, the coefficient f is a value which is set by the user and it is set in the multipliers 610 and 612 by CPU.

Although an embodiment according to the present invention has been described heretofore, the present invention is not limited to the embodiment, but it is obvious to the person skilled in the art that various changes and modifications are possible.

As can be clearly understood from the foregoing description, according to the present invention, due to the fact that the three primary colors B, G, and R are converted to the brightness signal V, hue signal H and chroma signal C before the color is edited, the color editing can be easily achieved with high accuracy and thus the editing accuracy can be improved. And, since the conversion from L*, a*, b* to V, H, C is performed by reducing the number of bits and by use of the LUT, the present LUT can be of a small capacity and also the conversion can be achieved at high speeds.

Further, due to the fact that a palette can be composed of a memory having a small capacity and such a color editing as is impossible in the prior art can be achieved, the productivity of a copying processing can be improved greatly.

What is claimed is:

1. A color image recording device comprising:
    image read means for separating an original document image by colors to output the same image in the form of signals of primary colors including red, green and blue;
    first color signal conversion means for converting the three primary color signals output from said image read means to generate a brightness signal and first and second color difference signals;
    image edit means for performing a specified color edit processing on output signals of said first color signal conversion means;
    second color signal conversion means for converting an output signal of said image edit means into a developing color; and
    image output means for recording an image in accordance with an output signal of said second color signal conversion means,
    said image edit unit including third color signal conversion means for converting the first and second color difference signals of output signals of said first color signal conversion unit into a hue signal and a chroma signal, image edit block for performing a specified color edit processing on the brightness signal output from said first color signal conversion unit as well as on the hue signal and chroma signal respectively output from said third color signal conversion means, and a fourth color signal conversion unit for converting the hue signal and chroma signal output from said third color signal conversion means into first and second color difference signals.

2. A color image recording device as defined in claim 1 wherein said third color signal conversion means comprises a lookup table which outputs a hue signal and a chroma signal respectively having a predetermined number of bits, said lookup table using as its input addresses predetermined high-order bits out of bits of said first and second color difference signals.

3. A color image recording device as defined in claim 1 wherein said fourth color signal conversion means comprises a lookup table which outputs first and second color difference signals respectively having a predetermined number of bits, said lookup table using as its input addresses said hue and chroma signals respectively having said predetermined number of bits.

4. A color image recording device as defined in claim 1 further comprising delay means which delays said brightness signal and first and second color difference signals respectively output from said first color signal conversion unit by a predetermined period of time, and selector means which inputs an output signal of said delay unit and an output signal of said image edit unit, selects one of said output signals in accordance with a switching control signal output from said image edit unit, and outputs said selected output signal to said second color signal conversion means.

5. A color image recording device as defined in claim 4 wherein said delay means comprises a variable delay circuit.

6. A color image recording device as defined in claim 4 wherein said image edit block outputs said switching control signal when a specified color is detected in a specified edit area.

7. A color image recording device as defined in claim 1 wherein said image edit block comprises palettes having a predetermined number of bits with respect to brightness, hue and chroma, and wherein when a predetermined menu has been selected, said image edit block converts pixels, an image brightness of which is not lower than a predetermined threshold value, into values specified by said palettes is a specified area, while allowing other pixels to pass therethrough as they are.

8. A color image recording device as defined in claim 1 wherein said image edit block comprises first and second palettes respectively having a predetermined number of bits with respect to brightness, hue and chroma, and wherein when a predetermined menu has been selected, said image edit block converts pixels, an image brightness of which is not lower than a predetermined threshold value, into values specified by said first palettes in a specified area, while converting other pixels into values specified by said second pallet.

9. A color image recording device as defined in claim 1 wherein said image edit block comprises palettes respectively having a predetermined number of bits with respect to brightness, hue and chroma, and wherein when a predetermined menu has been selected, said image edit block converts all pixels of an image into values specified by said palettes in a specified area.

10. A color image recording device as defined in claim 1 wherein said image edit block comprises palettes respectively having a predetermined number of bits with respect to brightness, hue and chroma, and wherein when a predetermined menu has been selected, said image edit block allows pixels, an image brightness of which is not lower than a predetermined threshold value, to pass therethrough as they are, while converting other pixels into values specified by said palettes.

* * * * *

UNITED STATES PATENT AND TRADEMARK OFFICE
CERTIFICATE OF CORRECTION

PATENT NO. : 5,200,832
DATED : April 06, 1993
INVENTOR(S) : Kazuman Taniuchi et al.

It is certified that error appears in the above-identified patent and that said Letters Patent is hereby corrected as shown below:

Abstract:
 line 5, change "." to --,--.

Column 22, claim 8, line 5, change "pallett" to --palette--.

Signed and Sealed this

First Day of March, 1994

Attest:

BRUCE LEHMAN

Attesting Officer    Commissioner of Patents and Trademarks